Figure 1:
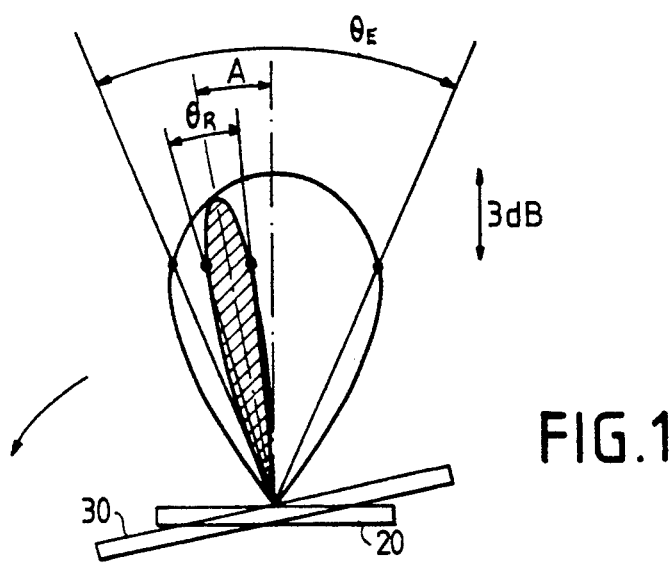

United States Patent [19]

Peynaud

[11] Patent Number: 5,163,026
[45] Date of Patent: Nov. 10, 1992

[54] METHOD FOR INCREASING THE IMAGE RATE OF A SONAR AND SONAR FOR THE IMPLEMENTATION OF THIS METHOD

[75] Inventor: Francois Peynaud, Brest, France

[73] Assignee: Thomson-CSF, Puteaux, France

[21] Appl. No.: 741,516

[22] PCT Filed: Feb. 16, 1990

[86] PCT No.: PCT/FR90/00111
§ 371 Date: Aug. 9, 1991
§ 102(e) Date: Aug. 9, 1991

[87] PCT Pub. No.: WO90/09600
PCT Pub. Date: Aug. 23, 1990

[30] Foreign Application Priority Data

Feb. 17, 1989 [FR] France ............................ 89 02080

[51] Int. Cl.$^5$ .................................................. G01S 15/00
[52] U.S. Cl. ........................................ 367/7; 367/101; 367/104
[58] Field of Search ...................... 367/101, 104, 7; 128/660.09; 73/633, 607

[56] References Cited

U.S. PATENT DOCUMENTS

| | | | |
|---|---|---|---|
| 2,871,459 | 1/1959 | Berry | 367/101 |
| 3,800,274 | 3/1974 | Peynaud | 367/90 |
| 3,818,425 | 6/1974 | Peynaud et al. | 367/12 |
| 4,104,912 | 8/1978 | Clavelloux et al. | 367/90 |
| 4,119,940 | 10/1978 | Keating et al. | 367/11 |
| 4,270,191 | 5/1981 | Peynaud | 367/91 |
| 4,308,749 | 1/1982 | Clavelloux et al. | 367/6 |
| 4,311,045 | 1/1982 | Clavelloux et al. | 367/6 |
| 4,322,974 | 4/1982 | Abele et al. | 73/602 |
| 4,516,226 | 5/1985 | Peynaud et al. | 367/6 |
| 4,596,007 | 6/1987 | Grall et al. | 367/92 |

FOREIGN PATENT DOCUMENTS 0036348 9/1981 European Pat. Off. .

OTHER PUBLICATIONS

Proceedings: ICASSP 87—1987 International Conference on Acoustics, Speech, and Signal Processing, 6-9 Apr. 1987, Dallas, Texas, vol. 3 de 4, IEEE, P.M. Casereau et al.: "Frequency hopping patterns for simultaneous multiple-beam sonar imaging", pp. 1704-1707.

Primary Examiner—Daniel T. Pihulic
Attorney, Agent, or Firm—Oblon, Spivak, McClelland, Maier & Neustadt

[57] ABSTRACT

The invention relates to a simple, cheap sonar system with high image rate, for the detection of objects and the imaging of sea bottoms. It consists in transmitting n uncorrelated successive codes in a sector of angular width exactly equal to n times the angular width of the reception sector $\theta_R$, the reception antenna continuing to turn during this time whilst the first signal transmitted has not yet reached the maximum range dmax, and in receiving, in the sector of angular width $\theta_R$, the echoes of these n codes, coming from n propagation regions which are adjacent in relation to the reception axis, and lying between 0 and dmax in space, each of them having a depth equal to dmax/n.

9 Claims, 3 Drawing Sheets

METHOD FOR INCREASING THE IMAGE RATE OF A SONAR AND SONAR FOR THE IMPLEMENTATION OF THIS METHOD

The present invention relates to a sonar system for the detection of objects and the imaging of sea bottoms. Such a sonar is intended to be installed in an underwater vehicle or in a ship's hull, at low cost; it must therefore be simple and cheap, and have a good image rate. In fact, because of the low speed of propagation of sound in water, the rate of renewal of information must be high so as to carry out correct sampling of the terrain or to carry out automatic extraction of targets, which extraction calls for the greatest possible independent returns from the target.

Classically, there exist three major types of operation for sonar systems, and each leads to specific hardware.

In a pulse-action single-beam sonar with rotatable mechanical scanning, the antenna is a single-element one and a single electronic reception system is required. This sonar is therefore simple and cheap. On the other hand, the transmission and reception transducers are generally directional and the reception transducer must remain aimed in the direction of transmission so long as the signal likely to return from the maximum distance has not arrived at the antenna. The speed of rotation of the antenna then remains limited to low values, and the image rate, in particular for systems having good angular resolution, is very low.

In a sonar with preformed channels, a wide sector is filled with sound on transmission, and at reception, with each pulse, channels are formed electronically throughout the sound-filled sector. The image of a complete sector is then obtained at a high image rate. This principle is very powerful but the complexity of the hardware is great, especially for installation in a small underwater vehicle.

Finally, in a continuous transmission frequency modulation (CTFM) sonar, the image rate is high but the resolution in distance is often low since it is inversely proportional to the number of spectral analysis filters present in the reception system. Moreover, the low reception band, after spectral analysis, renders the targets fluctuating, this being prejudicial to a good probability of detection.

In order to overcome these disadvantages and obtain a sonar which is simple, cheap, has wide-sector transmission, and offers an image rate increased by a factor n, the invention proposes another method, to be implemented in a sonar having a maximum range dmax and comprising a movable transmission antenna covering a current sector of angular width $\theta_E$ and a movable reception antenna covering a current sector of angular width $\theta_R$ centred in relation to an axis turning like the reception antenna, called the reception antenna axis, characterized in that it consists:

in transmitting, in the form of pulses, n uncorrelated successive codes (C1 to Cn) in a current sector of angular width $\theta_E$ exactly equal to $n\theta_R$, the transmission and reception antennae continuing to turn during this time in such a way that the rate of transmission of the codes corresponds to the time taken by the reception antenna to pass from the current sector of angular width $\theta_R$ to a following sector of angular width $\theta_R$, in the direction of turning of the reception antenna;

and in receiving, in the current sector of angular width $\theta_R$, the echoes of these n codes, coming from n propagation regions which are adjacent in relation to the reception antenna axis, and lying between 0 and dmax in space, each of them having a depth equal to dmax/n.

The subject of the invention is also a sonar for the implementation of this method.

Figure 2:
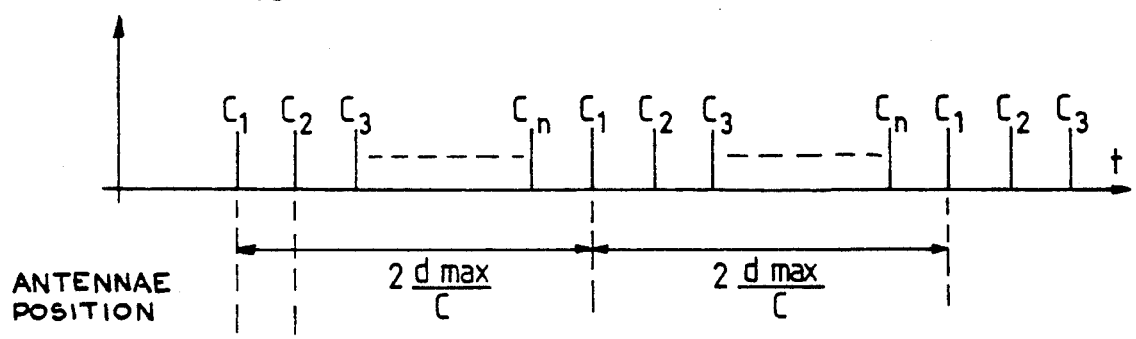
Figure 3:
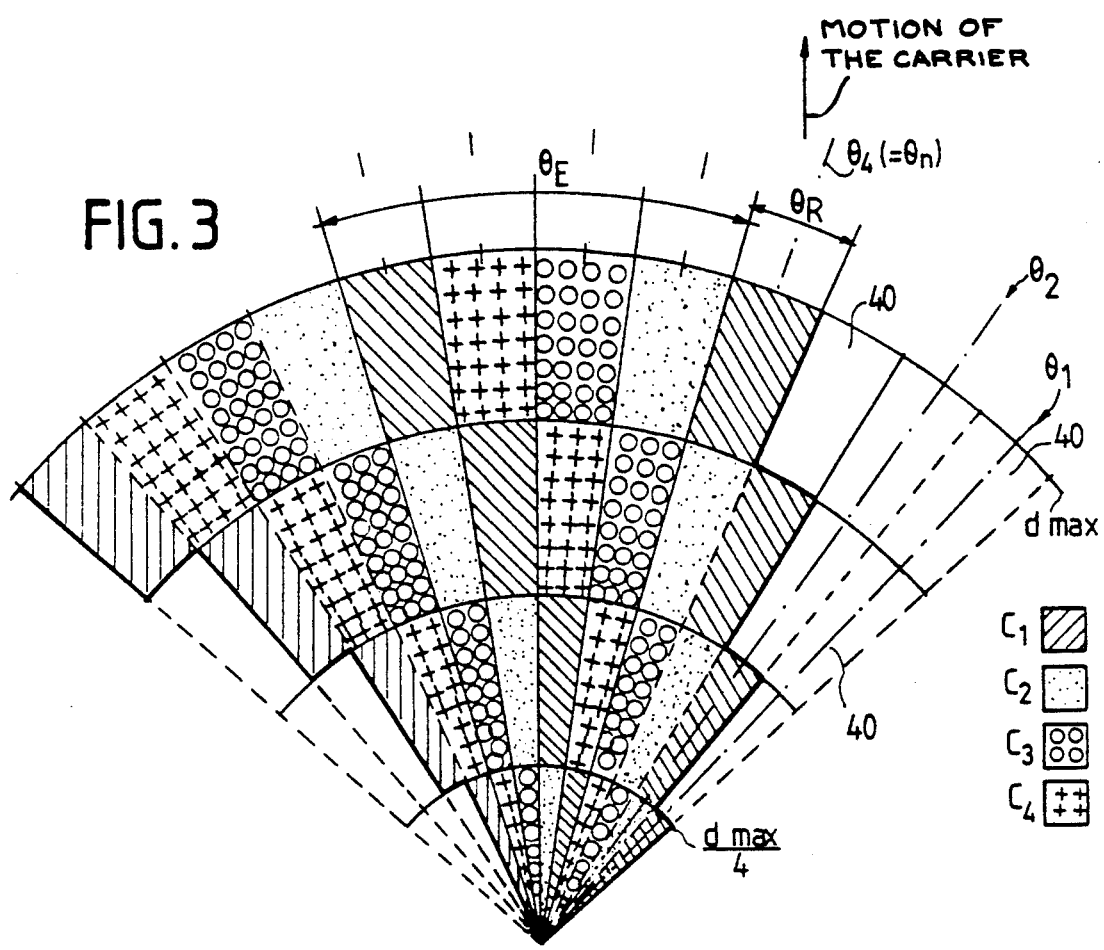

Other features and advantages of the invention will emerge clearly in the following description given by way of non-limiting example and made with reference to the attached figures which represent:

FIG. 1: The region of terrain observed on transmission and on reception, for a single-beam sonar with rotatable mechanical scanning according to the prior art, FIG. 2: The chart of the times of the transmission pulses and the position of the antennae as a function of time for a pulse-action single-beam sonar with rotatable mechanical scanning according to the invention, FIG. 3: The region of terrain observed by a pulse-action single-beam sonar with rotatable mechanical scanning for progressive reception antenna positions, according to the invention, FIG. 4: The region of terrain observed by a side-scan sonar with parallel preformed channels, according to the invention, FIG. 5: An example of the distribution of transmission frequencies in a pulse-action single-beam sonar with rotatable mechanical scanning according to the invention, FIG. 6: The general overview of a pulse-action single-beam sonar with rotatable mechanical scanning, according to the invention.

FIG. 1 represents the region of terrain observed on transmission and on reception for a single-beam sonar with rotatable mechanical scanning of the prior art, comprising a transmission antenna, 20, covering an angular sector $\theta_E$, and a reception antenna, 30, covering an angular sector $\theta_R$ such that $\theta_E$ is greater than $\theta_R$. In the figure, the positions of the transmission, 20, and reception, 30, antennae are represented at the instant of transmission and at the end of reception respectively. Between transmission and reception, the reception antenna, 30, must rotate by only a small angle A so as to allow the overlapping of the two angular sectors $\theta_E$ and $\theta_R$ covered by the two antennae. However, this condition is not sufficient since the observed region of terrain turns with the reception antenna. In order for all of the terrain to be observed, that is to say in order not to have a loss of more than 6 dB (3 dB on transmission and 3 dB at reception) in the echo received at the maximum range dmax, it is necessary for the angle A to be at most equal In a continuous transmission frequency modulation (CTFM) sonar, the image rate is high but the resolution in distance is often low since it is inversely proportional to the number of spectral analysis filters present in the reception system. Moreover, the low reception band, after spectral analysis, renders the targets fluctuating, this being prejudicial to a good probability of detection.

The U.S. Pat. No. 2,871,459 relates to a system intended to explore an annular region of terrain, and which uses several frequencies in order to avoid coupling between transmission and reception and reverberation phenomena. This system works in continuous transmission mode hence without resolution in distance other than the width of the ring, and does not make it possible to have a high image rate.

In order to overcome these disadvantages and obtain a sonar which is simple, cheap, has good resolution in distance, has wide-sector transmission, and offers an image rate increased by a factor n, the invention proposes another method, to be implemented in a sonar having a maximum range dmax and comprising a movable transmission antenna covering a current sector of angular width $\theta_E$ and a movable reception antenna covering a current sector of angular width $\theta_R$ centred in relation to an axis turning like the reception antenna, called the reception antenna axis, characterized in that it consists:

in transmitting, in the form of pulses, n uncorrelated successive codes ($C_1$ to $C_n$) in a current sector of angular width $\theta_E$ exactly equal to $n\theta_R$, the transmission and reception antennae continuing to turn during this time in such a way that the rate of transmission of the codes corresponds to the time taken by the reception antenna to pass from the current sector of angular width $\theta_R$ to a following sector of angular width $\theta_R$, in the direction of turning of the reception antenna;

and in receiving, in the current sector of angular width $\theta_R$, the echoes of these n codes, coming from n propagation regions which are adjacent in relation to the reception antenna axis, and lying between 0 and dmax in space, each of them having a depth equal to dmax/n.

The subject of the invention is also a sonar for the implementation of this method. at the start and at the end of rotation of the antennae, the observation sector exhibits "holes", 40, and its edges are of staircase shape. These "holes" correspond to the time necessary for the code signal $C_1$ and for the signal corresponding to the last code transmitted, to reach the distance dmax. Account must be taken thereof by making provision for a larger rotation relative to the desired sector of observation.

This method is applicable to any sonar system whatever its essential characteristics, such as its frequency, its range and its resolution.

The frequency coding can be arbitrary; in practice, for reasons of simplicity, a code of pure frequencies will be chosen so that the sonar retains its pulsatile characteristic and hence its good resolution in distance (which is not the case for CTFM devices).

The complexity of the sonar is increased very little, the antennae remain identical, and a single reception channel is retained, the signal having simply to be filtered as a function of the antenna position, hence of time.

Furthermore, as for sonars with preformed channels, it is necessary to fill a wider sector with sound, namely $n\theta_R$ exactly.

As for the other methods, the transmission and reception antennae can be collinear or partly common.

Figure 4:
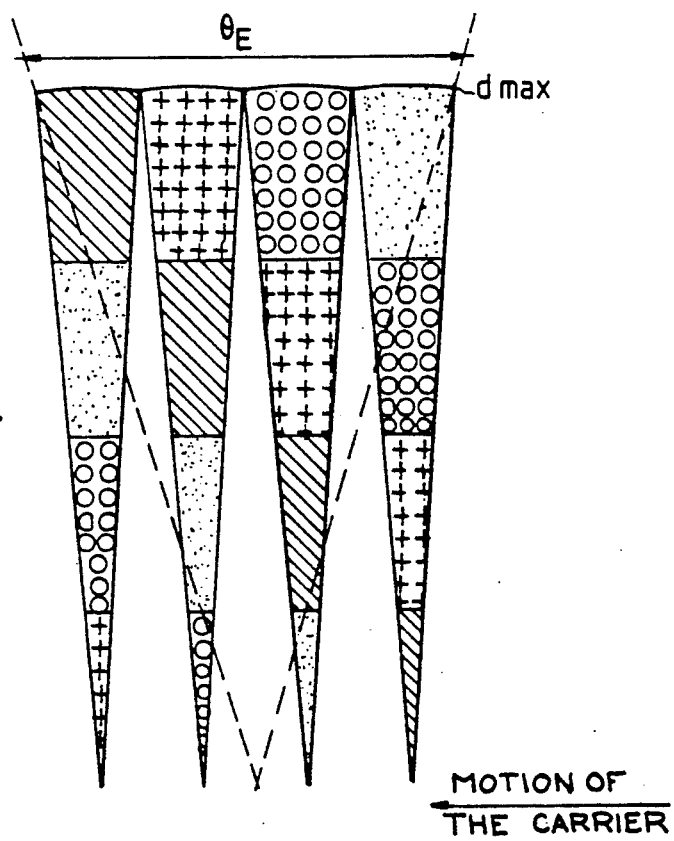

FIG. 4 represents the region of terrain observed by a side-scan sonar with parallel preformed channels when the transmissions are coded according to the invention.

In underwater acoustics, it is known to use a side-scan sonar with parallel preformed channels, fitted on a towed fish, in order to obtain an image of the sea bottom. In this case, there is no rotation of the antennae over time, but this rotation is replaced by the motion of the carrier. The invention therefore makes it possible to increase the speed of the carrier and the image rate, or to form only a single channel whilst maintaining the same image rate.

To obtain a complete sector of observation in the case of the side-scan sonar, it is simply necessary to prolong the observation time by 3 dmax/4 C, this corresponding to the acquisition phase.

A sonar intended to equip a low-cost vehicle, although powerful, must also be low cost; the choice then rests with a single-beam sonar with mechanical scanning, since the formation of channels is always expensive, given that it necessitates a large number of systems for parallel reception.

By way of example, the characteristics of an embodiment of the sonar according to the invention have been chosen such that the range is 75 m, the resolution in bearing is 1° 5, the observation sector is 60°, the observation time for the sector is 1 s, and the resolution in distance is 0.2 m. For the embodiment, using the well-known rules of the prior art for calculating acoustic systems, an operating frequency of 750 kHz, a pulse duration of 250 µs, a reception band of 4 kHz, and a mechanical scanning over 60° have been chosen.

With single-channel use requiring 4s to generate one image, the method according to the invention has been applied by choosing n=4. In this case, the speed of rotation of the antenna is 60°/s.

To produce such a sonar, a simple solution consists in choosing a code of distinct pure frequencies, namely four frequencies, in the reception band of the sonar. With the current technology in acoustics, a sonar can operate in a frequency band equal to 40% of the operating frequency, namely in a band equal to 300 kHz for the operating frequency which is chosen equal to 750 kHz. In fact, in this illustrative embodiment, only a quarter of this possible band is used, namely 75 kHz, the reception bands being 25 kHz distant. However, it is possible to increase the number of frequencies of this sonar as far as n=16, that is to say to make in a single channel the equivalent of a sonar with 16 preformed channels.

Figure 5:
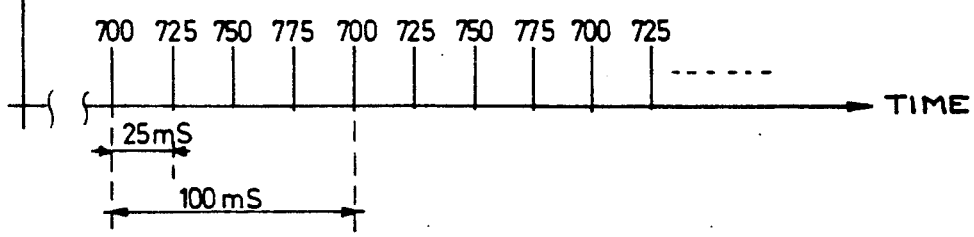

FIG. 5 represents an example of the distribution in time of the transmission frequencies.

The frequencies chosen are as follows: 700 kHz, 725 kHz, 750 kHz, and 775 kHz. This choice is made asymmetrically to avoid excessively high frequencies of which the absorption is large. One transmission is triggered every 25milliseconds, namely the equivalent of 18.75 m over the terrain.

Figure 6:
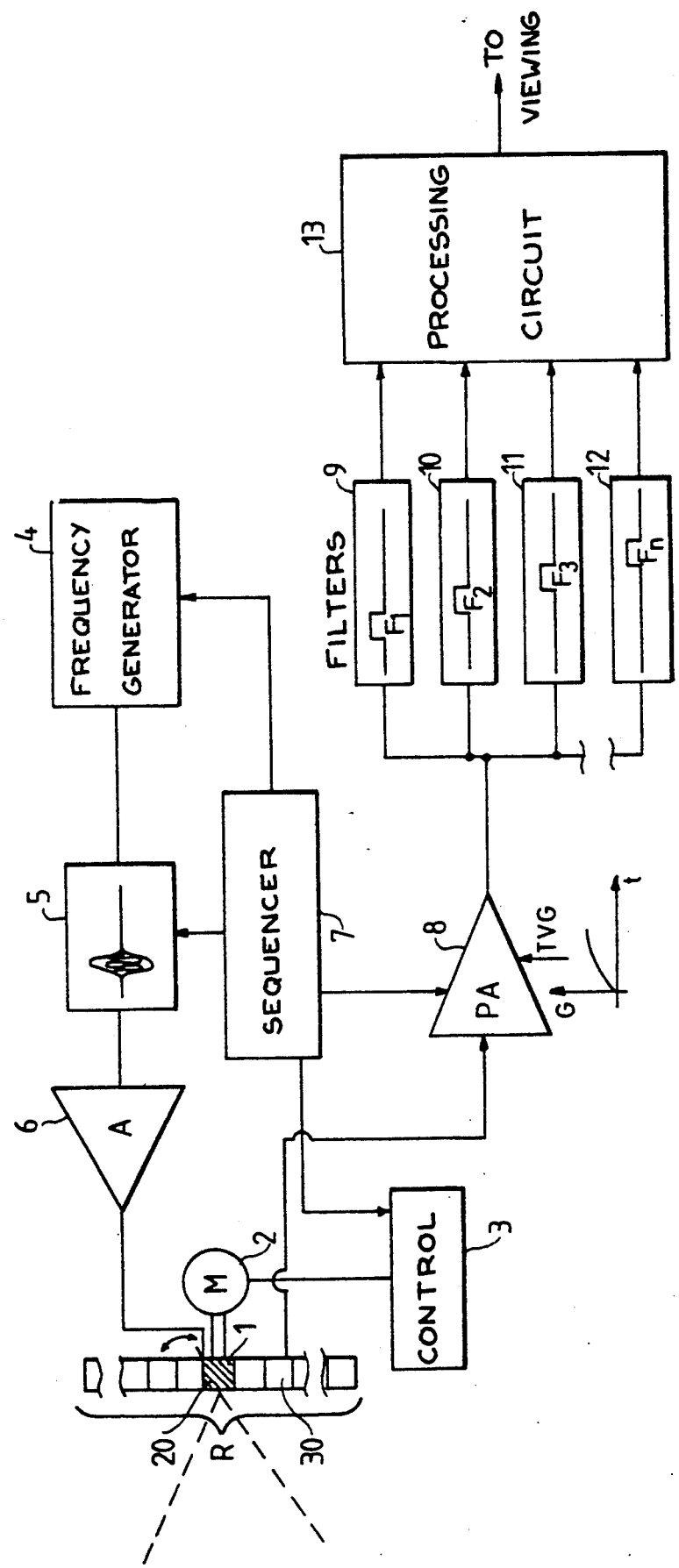

The general overview of this sonar, represented in FIG. 6, comprises a transmission system connected to the transmission antenna, 20, and reception system connected to the reception antenna, 30. The two antennae are represented as collinear but they can be separated. They are constituted by acoustic transducers which, at transmission, transform the electrical signal received into an acoustic wave, or which, at reception, transform the acoustic wave into an electrical signal.

The transmission antenna, 20, comprises a single acoustic transducer 1, serving at one and the same time for transmission and for reception, but one part only of the transducer, 1, will be used on transmission to cover an angular sector equal to 6°, namely the equivalent of 4 channels. The directivity of the antenna on transmission will in fact be only 12° for reasons of symmetry and in order to be able to explore space in both directions.

A motor, 2, provided with its control electronics, 3, drives the antennae over 60°.

The transmission system comprises:

a frequency generator, 4, which formulates the frequencies of 700 kHz, 725 kHz, 750kHz, and 775kHz.

a signal chopper, 5, which forms the pulses to be transmitted. So as to avoid the transmitted pulses perturbing the reception sectors, each pulse is weighted in time in order to generate secondary frequency lobes which are the smallest possible. The weighting used is Gauss or Hamming, or other known weightings;

a power amplifier, 6, which conveys the electronic energy to the transmitting part of the antenna;

a sequencer, 7, triggers the sequences at the right time and ensures the synchronising of the whole sonar.

The reception system comprises:

reception transducers forming the reception antenna and to which is connected a linear preamplifier, 8, which simultaneously receives the 4 frequencies and which possesses a filter allowing these 4 frequencies to pass, and rejects all the frequencies which do not lie between 698 kHz and 777 kHz. This preamplifier possesses an inhibiting signal which functions when transmission occurs. There will therefore be an absence of reception during the 4 transmissions, namely during a very short time ($4 \times 250$ μs), representing 1% of the time. This inhibition is necessary since there is a large difference in amplitude between the transmitted signal and the received signal (from 120 dB to 150 dB) and it is not possible to receive during transmission. This preamplifier 8 possesses a variable gain with time in order to compensate the losses by absorption. If absence of reception during transmissions is unacceptable, it is possible to double the number of transmitted codes n and change the transmission synchronisation, displacing it by a half-sequence, namely by 12.5 ms, every n transmissions, and to thus reconstruct one image without inhibition every 2 n sequences. In this case, the antenna must rotate twice as fast and only one image out of two is shown complete;

four filters, 9 to 12, allowing real-time reconstruction of the complete image over the 75 m of propagation. Thus, for example, the first filter will restore the signal between 0 and 18.75 m, the second between 18.75 m and 37.5 m, the third between 37.5 m and 56.25 m and the fourth between 56.25m and 75 m. Particular attention will be paid to the quality of these filters which must possess a large dynamic range, of the order of 80 dB, and a capacity for rejecting neighbouring frequencies of the order of 60 dB. In the current state of the art, quartz filters are very well suited to this problem;

finally, the signals emanating from the four filters undergo conventional processing carried out in a processing circuit, 13, such as a precise check of the amplitude of the signals by an amplitude regulator, detection, integration in order to eliminate rapid fluctuations in the signal and improve the signal-to-noise ratio, and digitising in order to convert the analog signal into a digital signal.

The signals emanating from this processing circuit, 13, are then shown on a viewing device.

The system described in this example reflects a conventional analog embodiment of the reception part. It is equally possible to use an analog/digital conversion system at the output of the preamplifier, 8, with filtering and digital processing.

Furthermore, a change of frequency or an arbitrary demodulation can also be envisaged. Processing operations equivalent to the one described specifically, do not call into question the application of the method.

Finally, the invention is not limited to a code of pure frequencies; it is possible to use other codes, for example a code of disjoint modulated frequencies.

I claim:

1. Method for increasing by a factor n the image rate of a sonar having a maximum range dmax and comprising a movable transmission antenna covering a current sector of angular width $\theta_E$ and a movable reception antenna covering a current sector of angular width $\theta_R$ centred in relation to an axis turning like the reception antenna, called the reception antenna axis, characterized in that it consists:

in transmitting, in the form of pulses, n uncorrelated successive codes (C1 to Cn) in a current sector of angular width $\theta_E$ exactly equal to $n\theta_R$, the transmission and reception antennae continuing to turn during this time in such a way that the rate of transmission of the codes corresponds to the time taken by the reception antenna to pass from the current sector of angular width $\theta_R$ to a following sector of angular width $\theta_R$, in the direction of turning of the reception antenna;

and in receiving, in the current sector of angular width $\theta_R$, the echoes of these n codes, coming from n propagation regions which are adjacent in relation to the reception antenna axis, and lying between 0 and dmax in space, each of them having a depth equal to dmax/n.

2. Method according to claim 1, characterized in that the successive codes are distinct pure frequencies.

3. Pulse-action single-beam sonar for the implementation of the method according to any one of the preceding claims, comprising a transmission antenna (20) and a reception antenna (30), a transmission system connected to the transmission antenna (20), a reception system connected to the reception antenna (30), the reception system comprising in series a preamplifier (8), filters (9 to 12) and a circuit (13) for processing the output signal from the filters, characterized in that:

the transmission antenna is movable and covers a current sector of angular width $\theta_E$ the reception antenna is movable and covers a current sector of angular width $\theta_R$, $\theta_R$ being n times smaller than $\theta_E$ the transmission system comprises in series a frequency generator (4) controlled by a sequencer (7) for formulating n frequency codes, and a signal chopper (5) controlled by the sequencer (7) for transmitting, in the form of pulses, the n frequency codes at a rate corresponding to the time taken by the reception antenna to pass from a current sector of angular width $\theta_R$ to a following sector of angular width $\theta_R$, in the direction of turning of the reception antenna and in that, in the reception system, the filters (9 to 12) are centred respectively on the frequencies corresponding to the codes in order to receive, in the current sector of angular width $\theta_R$, the echoes of the n codes coming from n propagation regions which are adjacent in relation to the reception antenna axis, and lying between 0 and dmax in space, each of them having a depth equal to dmax/n, and in order to reconstruct in real time the complete image of the corresponding sector of observation $\theta_R$ over the propagation length dmax.

4. Sonar according to claim 3, characterized in that the preamplifier (8) possesses an inhibiting signal which functions when transmission occurs.

5. Sonar according to claim 3, characterized in that the filters (9) to (12) are quartz filters.

6. Sonar according to any one of claims 3 to 5, characterized in that the transmission and reception antennae are collinear or partly common.

7. Sonar according to any one of claims 3 to 5, characterized in that it is a frontal single-beam sonar, the movable transmission and reception antennae being rotatable.

8. Sonar according to claim 7, characterized in that it is a pulse-action, mechanical scanning and wide-sector multifrequency transmission sonar.

9. Sonar according to any one of claims 3 to 5, characterized in that it is a parallel-channel side-scan sonar, the transmission and reception antennae being movable on account of the motion of the carrier.

* * * * *